(12) United States Patent  
Chapman et al.

(10) Patent No.: US 8,896,886 B2
(45) Date of Patent: Nov. 25, 2014

(54) COLOR DIFFERENTIAL GLOSS SECURITY PRINTING

(71) Applicant: Xerox Corporation, Norwalk, CT (US)

(72) Inventors: Edward N. Chapman, Rochester, NY (US); Reiner Eschbach, Webster, NY (US); Martin Sidney Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/776,868

(22) Filed: Feb. 26, 2013

(65) Prior Publication Data

US 2014/0240790 A1 Aug. 28, 2014

(51) Int. Cl.
*H04N 1/40* (2006.01)
*H04N 1/00* (2006.01)

(52) U.S. Cl.
CPC .................................. *H04N 1/00883* (2013.01)
USPC ........... 358/3.28; 358/1.9; 358/450; 358/540; 358/3.06

(58) Field of Classification Search
None
See application file for complete search history.

(56) References Cited

U.S. PATENT DOCUMENTS

| 6,032,004 | A | 2/2000 | Mirabella, Jr. et al. |
| 7,639,400 | B2 | 12/2009 | Hains |
| 7,852,515 | B2 | 12/2010 | Eschbach et al. |
| 8,064,100 | B2 | 11/2011 | Braun et al. |
| 8,064,102 | B1 * | 11/2011 | Zhao et al. ...................... 358/1.9 |
| 8,111,432 | B2 | 2/2012 | Eschbach et al. |
| 8,261,988 | B2 * | 9/2012 | Zhao et al. ............... 235/462.09 |
| 8,456,700 | B2 * | 6/2013 | Mestha et al. .................. 358/1.9 |
| 8,537,417 | B2 * | 9/2013 | Braun ............................ 358/1.9 |
| 2005/0166781 | A1 * | 8/2005 | Fritz et al. ...................... 101/491 |
| 2008/0068630 | A1 * | 3/2008 | Itagaki ............................ 358/1.9 |
| 2008/0302263 | A1 | 12/2008 | Eschbach et al. |
| 2008/0305444 | A1 | 12/2008 | Eschbach et al. |
| 2010/0128321 | A1 | 5/2010 | Wang et al. |
| 2010/0231980 | A1 | 9/2010 | Chapman et al. |
| 2011/0149312 | A1 * | 6/2011 | Mestha et al. .................. 358/1.9 |
| 2011/0286015 | A1 | 11/2011 | Maltz et al. |
| 2012/0140290 | A1 * | 6/2012 | Eschbach et al. ............ 358/3.28 |

* cited by examiner

*Primary Examiner* — Dung Tran
(74) *Attorney, Agent, or Firm* — Gibb & Riley, LLC

(57) ABSTRACT

Methods and devices identify gloss levels and appearance colors for different printers based on the common printing capabilities of the different printers. Such gloss levels and appearance colors are formed from different combinations of one or more colorant marking materials combined or stacked on a print substrate surface. Further, such methods and devices identify common color metameric pairs based on the gloss levels and the appearance colors. Each of the common color metameric pairs has the same appearance color, but has a different gloss level. Patterns of different gloss levels in an area of uniform appearance color form a differential gloss security feature on a printed document. The methods herein can store a file with the common color metameric pairs in a non-transitory storage medium that is operatively connected to at least one of the different printers.

24 Claims, 5 Drawing Sheets

COLOR DIFFERENTIAL GLOSS SECURITY PRINTING

BACKGROUND

Embodiments herein generally relate to security printing and more particularly to systems, devices, and methods that print multi-color differential gloss security features on sheets of media.

In the area of security printing, documents are protected from copying, forging and counterfeiting using multiple techniques. Some methods of security printing use standard materials such as papers inks and toners; however, more typically security printing requires special and expensive materials. Example documents needing security printing include legal documents, negotiable documents, prescriptions, etc., where a user would like to be able to have a high level of confidence that the document is genuine.

Some printing techniques enable printing small overt security features that could not easily be copied by a digital copier, if at all. However documents protected with such features can potentially be reproduced with reverse engineering.

SUMMARY

Exemplary methods herein identify gloss levels and appearance colors for different printers based on the common printing capabilities of the different printers. Such gloss levels and appearance colors are formed from different combinations of one or more colorant marking materials combined or stacked on a print substrate surface.

Further, such methods identify common color metameric pairs based on the gloss levels and the appearance colors. Each common color metameric pair has a single appearance color (that is different from other metameric pairs) but has a different gloss level. The gloss levels are different based on various factors, such as different heights of the stacks of colorant marking materials on the print substrate surface. Patterns of different gloss levels in an area of uniform appearance color form a differential gloss security feature on a printed document. The differences in the gloss levels are only observable at a non-perpendicular angle to the print substrate surface that reflects the different gloss levels differently, providing such a differential gloss security feature.

When identifying the common color metameric pairs, the methods herein evaluate the gloss levels and the appearance colors for different combinations of the colorant marking materials stacked on the print substrate surface. This evaluating process produces a gloss level value and an appearance color value for each of the combinations of the colorant marking materials. Then, the methods herein select a metameric pair, for each of the appearance colors, that has the relatively largest difference of gloss level value and no difference (or the relatively smallest difference) of the appearance color value.

The methods herein can store a file with the common color metameric pairs in a non-transitory storage medium that is operatively connected to at least one of the different printers. Then, each of such different printers can access the file containing the common color metameric pairs within the non-transitory storage medium. The specific printer accessing file then identifies specific metameric pairs from the common color metameric pairs that correspond to the specific printer. This allows the specific printer to process a print job using the specific metameric pairs to produce printed items having a differential gloss security feature. Again, such a differential gloss security feature comprises patterns of different gloss levels in an area of uniform appearance color. When processing the print job, the processor device can extrapolate between the specific metameric pairs to produce additional colors required for the print job.

Various printing device embodiments herein include a processor device, and an input/output device and printing engine operatively connected to the processor. The processor device accesses, through the input/output device, the common color metameric pairs stored within the non-transitory storage medium external to the printing device.

Again, each of the common color metameric pairs has the same appearance color, but a different gloss level. The gloss levels and the appearance colors are based on common printing capabilities of different printers, and the printing device is one of those different printers. The processor device identifies specific metameric pairs from the common color metameric pairs corresponding to the printing device. The processor device can then process a print job through the printing engine using the specific metameric pairs to produce printed items having a differential gloss security feature. Again, the differential gloss security feature comprises patterns of different gloss levels in an area of uniform appearance color. The processor device can extrapolate between the specific metameric pairs to produce additional colors of the print job during the processing of the print job.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
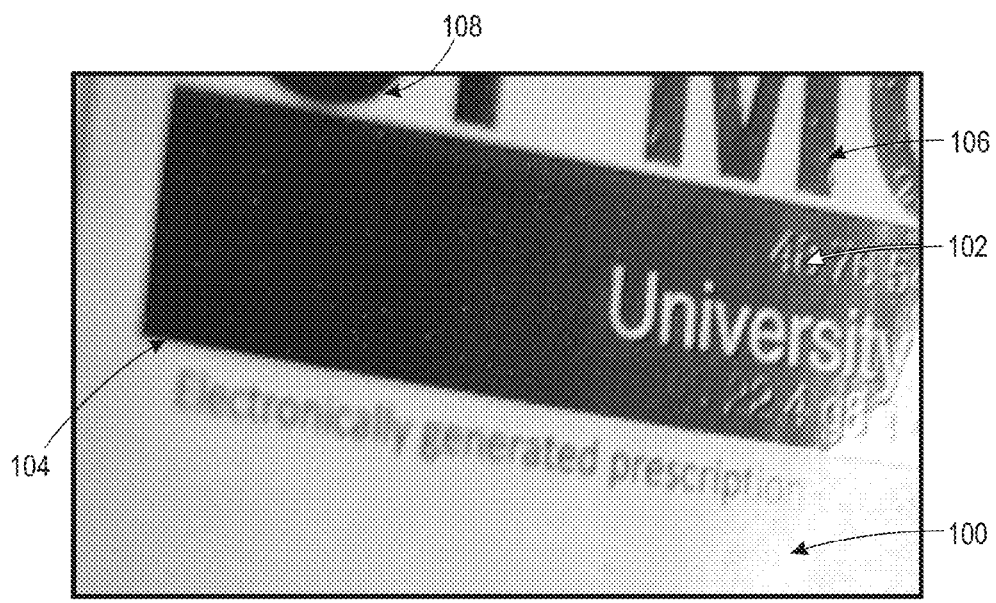
FIG. 1 is an image printed according to embodiments herein.

As mentioned above, some printing techniques enable printing small overt security features that are not easily copied by a digital copier. To provide security without using specialized and expensive equipment and toners, devices and methods herein utilize multiple gloss levels.

Markings made using gloss level differentiation (sometimes referred to herein as gloss level markings) is a security technique that does not require a special tool to view, and is an especially strong anti-copying technique. Gloss level markings use a pair of colors that appear to be about the same CMYK (cyan, magenta, yellow, black) color when viewing straight on (perpendicular to the page) but show a differential gloss when tilting due to the pile height of the toner or ink.

As discussed in U.S. Patent Publication 2012/0140290, portions of which are incorporated herein, colorant marking materials are commonly the fundamental subtractive cyan, magenta, yellow, black (CMYK) primaries, which may be realized in formulation as, liquid ink, solid ink, dye, electrostatographic toner, etc. The term metameric means the ability to use multiple colorant marking material combinations to render a single visual color, as can be achieved when printing with more than three colorants. Metameric is used in the colloquial sense and not in the strict mathematical sense. The colors may not be 100% metameric because the light source and paper type may not be known. Therefore, the metameric pairs herein are those with the smallest difference in color appearance, and may not be strictly identical colors.

A digital color description is commonly converted by a printing device from some device independent calorimetric color space into a machine specific physical colorant combination that will be deposited onto the physical substrate in the actual print production. That is, a set of colors lies within a common gamut of various printing devices and is defined within a device-independent color space.

Transformation of an input color to a physical colorant combination is generally done following the standard ICC (International Color Consortium) implementation. In this implementation input colors are related to output physical colorant combinations using transformation tables. The transformation will generally involve some form of interpolation between measured values. In essence, it is impractical and inefficient to store all possible color to colorant combinations. For example, a standard red, green, blue (RGB) image at eight bits can have 256×256×256, or approximately 16 million, colors and RGB does not yet cover all colors that can be seen by a human.

Consequently, the color to colorant transformation may be done in a table look-up manner, in which a subset of the possible color to colorant combinations is measured and the result of this subset is stored inside the printer. All other colors will then be determined by interpolating between the known and measured values. This is understandable considering that the input color space has three components and the output colorant space has four or more components. There are thus entire sets of physical colorant marking material combinations that will give the same visual color, except for degenerate cases at the boundary or other singularities of real systems. Mathematically, this can be expressed by the mapping:

$$\begin{bmatrix} R \\ G \\ B \end{bmatrix} \Rightarrow \left\{ \begin{bmatrix} C_1 \\ M_1 \\ Y_1 \\ K_1 \end{bmatrix}, \begin{bmatrix} C_2 \\ M_2 \\ Y_2 \\ K_2 \end{bmatrix}, \begin{bmatrix} C_3 \\ M_3 \\ Y_3 \\ K_3 \end{bmatrix}, \ldots, \ldots, \begin{bmatrix} C_N \\ M_N \\ Y_N \\ K_N \end{bmatrix} \right\},$$

In the above mapping, $N \geq 1$. The case of $N=1$ is the degenerate case, i.e., mapping "pure" colors. Normally, the mappings are picked so as to form the basis for the ICC profile, where the selection is done based on other criteria, such as preferred amount of under color removal. In essence, standard color printing picks one of the N physical colorant combinations to use as the color to colorant transformation, effectively ignoring the remaining N-1 possibilities.

Printers typically use the same RGB grid for their profiles; thus, it is possible to use this common grid for the subsequent color definitions. It is not necessary to have any knowledge, or make any assumption about, the spacing, distribution or separability of these RGB triplets in the continuous RGB color space. In terms of interpolation accuracy, these points will have the best quality of all general RGB triplets, since all other triplets will be obtained by secondary interpolation from this discrete basic set. In general, the errors caused by this secondary interpolation are small, but since strongly metameric colors are involved, the systems and methods herein strive to avoid any possible sources of error.

FIG. 1 shows a monochrome example of a printed item 100 having gloss level markings 102 (numbers "48"; "76"; "54"; etc.) that are positioned within an otherwise uniform region 104. The center and right-side portions of the sheet 100 shown in FIG. 1 are viewed at a non-perpendicular angle with non-perpendicular lighting to allow the gloss differentiation to be easily viewed. When viewed from a perpendicular angle to the sheet (as shown on the left side of FIG. 1) the gloss differentiation is not easily viewed, and would not be copied with a copier.

Note that in FIG. 1, typically the gloss glyphs in the entire black rectangle 104 are visible under typical overhead office illumination. For the picture shown in FIG. 1, a small LED was the light source. Also, FIG. 1 illustrates that parts 106 of the text over the black box exhibit the gloss level markings (seen at a non-perpendicular angle) and other parts 108 do not (because they are viewed from a perpendicular angle).

In the gloss level marking process, two different colorant quadruplets can have a constant or almost constant "black" color, but have different gloss levels. In essence, the gloss level marking process alternates between k-black and rich-black, for example between (0,0,0,255) and (255,255,255, 255). This is a simplified view ignoring, for example, ink limits of a certain device. One component of gloss level markings is fine detail behavior. In order to get a good differential gloss, the gloss level markings use small character structures, and are therefore sometimes referred to as micro-gloss features. Small structures loosen the requirement on color matching, because fine detail color changes are much harder to see than fine detail luminance changes. With this additional input, the gloss level markings use a second quadruplet pair of (0,0,0,205) & (255,255,255,205).

Figure 2:
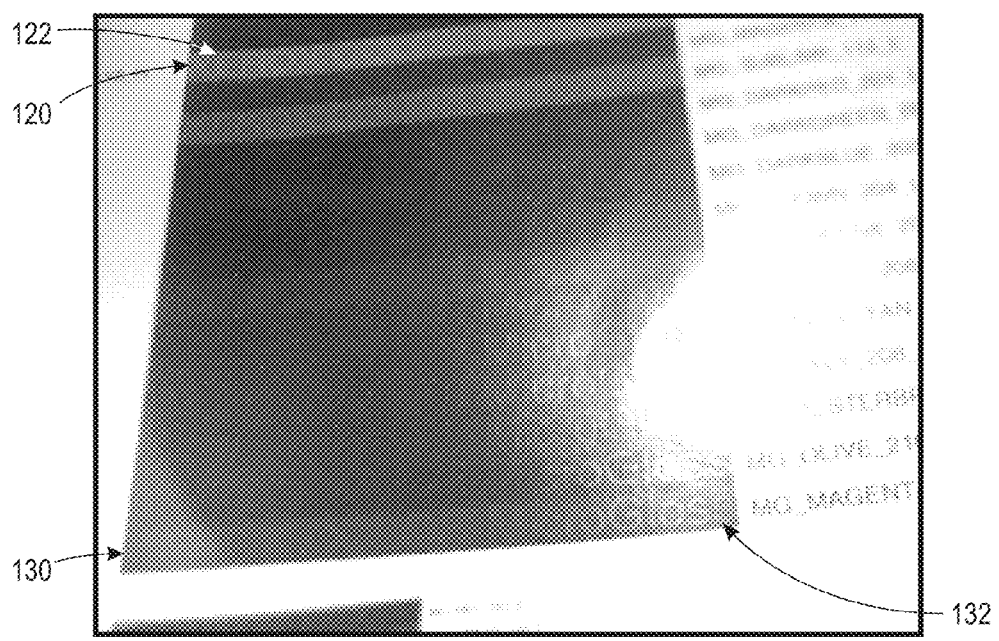
FIG. 2 is an image printed according to embodiments herein.

FIG. 2 illustrates a print having different appearance color stripes 120, 130, etc., printed with differential gloss. The photograph in FIG. 2 illustrates a yellow stripe 120 near the top that has differential gloss shapes (features) 122. The arrow of item 122 points to the letter "R" which is the same yellow color as the remainder of the yellow stripe 120; however, the shape "R" 122 has a different gloss level relative to the remainder of the stripe 120. Similarly, magenta stripe 130 in FIG. 2 includes differential gloss patterns, one of which is identified as item 132 (which is the letter "s").

Figure 3:
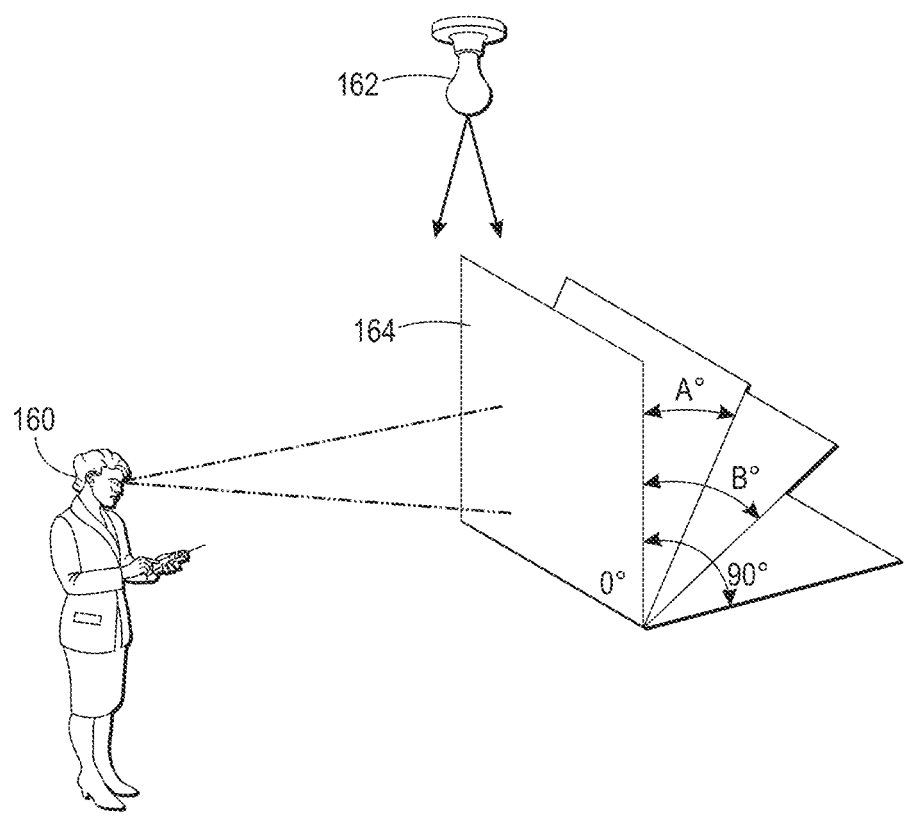
FIG. 3 is a schematic diagram illustrating effects achieved by embodiments herein.

As mentioned above, the gloss marks 102, 106, 122, 132 are only observable at a non-perpendicular angle to the printed media that reflects different gloss levels differently. As shown in FIG. 3, the observation of the gloss marks depends on the relative positions of the light source 162, the observer 160, and the printed sheet 164. As shown in FIG. 3, the observer 160 would not distinguish between different gloss levels when the printed sheet 164 is viewed at a perpendicular angle (e.g., at 0°). However, as the printed sheet of media 164 is tilted so that the printed sheet 164 is viewed at a non-perpendicular angle (e.g., at A°, B°, etc.) the gloss markings will become visible to the observer 160. As the tilting of the printed sheet 164 continues, the gloss markings will still be visible until a certain angle (arbitrarily shown as angle B°) where they remain unseen to 90°. As would be understood by those ordinarily skilled in the art, the angles between which the gloss markings are visible (e.g., A° and B° in this arbitrary example) will change as the position between the light source 162, the observer 160, and the printed sheet 164 change.

Any conventionally known method of printing gloss patterns (such as those disclosed in U.S. Patent Publication 2010/

0128321, relevant portions relating to gloss patterning techniques of which are incorporated herein by reference) or any gloss patterning methods developed in the future can be used with embodiments herein. The different gloss patterns have first (e.g., relatively higher (or lower)) gloss regions and second (e.g., relatively lower (or higher)) gloss regions (based, for example, on the height of the toner or ink printed). In other words, the first gloss regions have the same CMYK color, but have a different gloss level (either higher or lower) when compared to the second gloss regions.

Thus, the first and second gloss regions appear about the same when viewed perpendicular (at 0°) to the printed media, but show a differential gloss when tilting (viewed at a non-perpendicular angle to the printed media) due to the pile height of the toner or ink. The gloss difference at the boundaries between the first and second gloss regions forms "gloss marks" that can only be observed when viewing at a non-perpendicular angle to the printed media. The gloss marks can be numbers, characters, images, structures, etc.

It is possible to sort N possible colorant combinations in the order of increasing colorant material, and thus know which combination of colorant material has the lowest amount of colorant material and which combination of colorant material has the highest amount of colorant material. This allows the height of a stack of colorant material to be known All possible colorant combinations define a metameric set of colorants, meaning that different physical colorant combinations yield the same visual perception, or color. From the large set of (non-unique) color mappings and for each color and output device, a metameric pair of device colorant values corresponding to minimum and maximum amount of colorant material (stack height) is selected, i.e., $[C,M,Y,K]_1$ and $[C,M,Y,K]_N$. These extremes are selected in order to obtain the maximum perceivable gloss differential between the same apparent color.

Making some assumptions can reduce the complete set of mappings. For example, it can be assumed that the only interest is in the relative gloss characteristics of the metameric pair and not in absolute gloss values. This relative strength assumption makes it possible to consider each RGB triplet independent of all other triplets. Alternatively, different selection mechanisms, such as absolute evaluating, etc., could be used. For example, it is possible to select percentage gloss requirement.

Also, the gloss characteristics response of the different colors can be assumed to be linearly related to the black colorant material component of the CMYK quadruplet. While this is not completely accurate, correction terms needed for the other colorants are commonly smaller by at least one order of magnitude. For example, the CMY colorants each reflect 93+% of the gloss characteristics light, whereas carbon black K reflectance is on the order of 3%. For comparison, the paper reflectance is essentially constant at 100%. Additionally, it can be assumed that there is a larger overlap in the permitted toner area coverage for the devices. A larger overlap is directly related to the number of non-unique physical colorant combinations for a given visual color.

The metameric pair sets are then processed to extract a smaller subset that satisfy certain criteria, including bounds on the gloss difference to ensure an appropriate trade-off between gloss characteristics and visibility under normal light, total ink area coverage, and deviation from the neutral axis.

Thus, with these exemplary assumptions, it is possible to select or filter the RGB to CMYK color tables without the need to print large numbers of test sheets. In the first filtering, the number of quadruplets is reduced by only considering $[C_1, M_1, Y_1, K_1]$ and $[C_N, M_N, Y_N, K_N]$ based on the quasi-linear dependence of the gloss characteristics signal. In a second step, all CMYK combinations that have toner coverage above a "reasonable" number, say 250%, are eliminated. Here, the criterion for reasonable is commonly associated with physical limitations of the device and known a priori. Total area coverage, for example, influences the physical pile height of toners and the total mass of colorants that is deposited. Again, it is not crucial to have an accurate number, but rather a rough number is sufficient. Alternatively, it would also be possible to filter based on the expected ΔE/ΔE2000 error that is part of the printer model infrastructure.

The two exemplary filtering steps outlined above result in a list of metameric colors that can be sorted, making use of the assumption that the only interest is in relative gloss characteristics. Here, another implicit assumption can be incorporated, namely, that all printing devices generally have a large overlapping gamut and that the relative strength of the gloss characteristics signal is maintained over many different products. This view may be confirmed by the fact that past gloss characteristics were in fact identical for the supported devices. Also some toners should be considered separately. It is noted that the "common" gloss characteristics colors refer to common RGB input colors and that the actual physical CMYK colorant values used for rendering will indeed be machine dependent.

Described above is an exemplary method of obtaining a set of "universal" RGB (or L*a*b*) colors that have a metameric pair with a reasonable gloss characteristics response. This "reasonable" response for "universal" colors is useful over the "optimized" response for "device specific" colors, since it is generally not known to provide a system where the PostScript (or other PDL) constructs have to be changed as a function of print engines. Rather, the present systems and methods produce a common visual color over all supported machines with a single call and that call has a sufficient gloss characteristics response to be usable in a system.

Alternatively it is possible to reuse standard spot color mechanisms to encode the gloss characteristics colors with the added caveat that the gloss characteristics colors are always defined as matched pairs-identical RGB/L*a*b* but different CMYK. Generally, all "names" would stay the same, the actual CMYK values, however, would be different, exactly in the same way that the actual CMYK numbers are different for any named spot color. It is further noted that the color-name inside the PostScript/PDF/PDL file is the same and that the file is thus portable across devices. With this system it is possible to create "constant" colors that are quasi-optimized for each device, while only supporting one PDL construct (one unique color name). Rendering of that color name into an actual CMYK quadruplet is done by the digital front end (DFE) of the printer controller, where the mappings are stored as standard Postscript resources.

Figure 4:
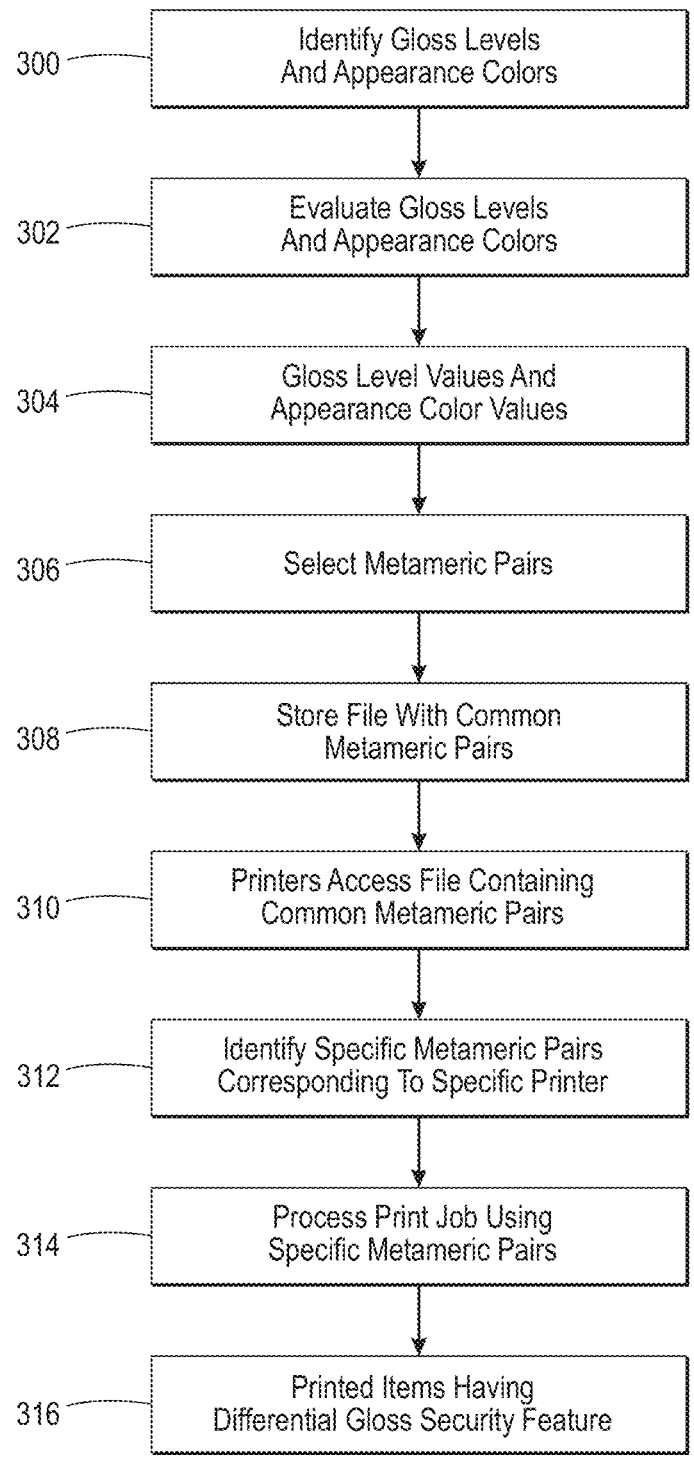
FIG. 4 is a flow diagram illustrating various embodiments herein.

FIG. 4 is flowchart illustrating exemplary methods herein. As shown in item 300 in FIG. 4, methods herein identify gloss levels and appearance colors for different printers based on the common printing capabilities of the different printers. Such gloss levels and appearance colors are formed from different combinations of one or more colorant marking materials combined or stacked on a print substrate surface.

Further, in items 302–306, such methods identify common color metameric pairs based on the gloss levels and the appearance colors. Each common color metameric pair has the same appearance color, but has a different gloss level. Further, each common color metameric pair can have a different appearance color, relative to other common color metameric pairs. The gloss levels are different based on various factors, such as different heights of the stacks of colorant marking materials on the print substrate surface. Patterns of different gloss levels in an area of uniform appearance color form a differential gloss security feature on a printed document. The differences in the gloss levels are only observable at a non-perpendicular angle to the print substrate surface that reflects the different gloss levels differently, providing such a differential gloss security feature.

When identifying the common color metameric pairs, the methods herein evaluate the gloss levels and the appearance colors for different combinations of the colorant marking materials stacked on the print substrate surface in item 302. This evaluating process produces a gloss level value and an appearance color value for each of the combinations of the colorant marking materials, as shown in item 304. Then, the methods herein select a metameric pair, for each of the appearance colors, that has the relatively largest difference of gloss level value and no difference (or the relatively smallest difference) of the appearance color value in item 306. As mentioned above, within each metameric pair the colors may not be exactly the same. Therefore, some compromise is made to achieve the metameric pair that has the closest color match (for the potentially wide variety of printers on which it may be applied); and such a compromise may reduce the difference of gloss level value. Therefore, gloss differential may be sacrificed somewhat if a closer appearance color match can be achieved.

As mentioned above, in items 302–306, filtering steps result in a list of metameric colors that can be sorted, making use of the assumption that the only interest is in relative gloss characteristics. It can also be assumed that all printing devices generally have a large overlapping gamut and that the relative strength of the gloss characteristics signal is maintained over many different products. Also some toners are considered separately and the actual physical CMYK colorant values used for rendering will be machine dependent.

One technique for finding a set of CMYK values that gives a requested L*a*b* color is to tessellate the printer model, which is a CMYK to LAB lookup table, into a set of space filling pentahedrons. To a good approximation, the relationship between CMYK and LAB is linear in each pentahedron. Therefore, within each pentahedron, a locus of constant L*a*b* is simply a straight line. It can be found where this straight line penetrates the faces of the pentahedron, and the pentahedrons adjacent to these faces can also be found. Continuing this process the rest of the constant L*a*b* locus can be found.

Thus, for example, when sorting the metameric colors, the sorting process can look for a minimum threshold of stack height differences and a maximum K value to remove very dark colors. Also the list can be further narrowed to remove colors near another color already accepted. From this list a print is made (with, for example, 4 shades of orange, 4 shades of purple, etc.) and the final selection of metameric pairs can be manually selected.

The methods herein can store a file with the common color metameric pairs in a non-transitory storage medium that is operatively connected to at least one of the different printers in item 308. Then, each of such different printers can access the file containing the common color metameric pairs within the non-transitory storage medium in item 310. The specific printer accessing the file then identifies specific metameric pairs from the common color metameric pairs that correspond to the specific printer in item 312.

This allows the specific printer to process a print job using the specific metameric pairs in item 314 to produce printed items having a differential gloss security feature (item 316). Again, such a differential gloss security feature comprises patterns of different gloss levels in an area of uniform appearance color. When processing the print job, the processor device can extrapolate between the specific metameric pairs to produce additional colors required for the print job.

Figure 5:
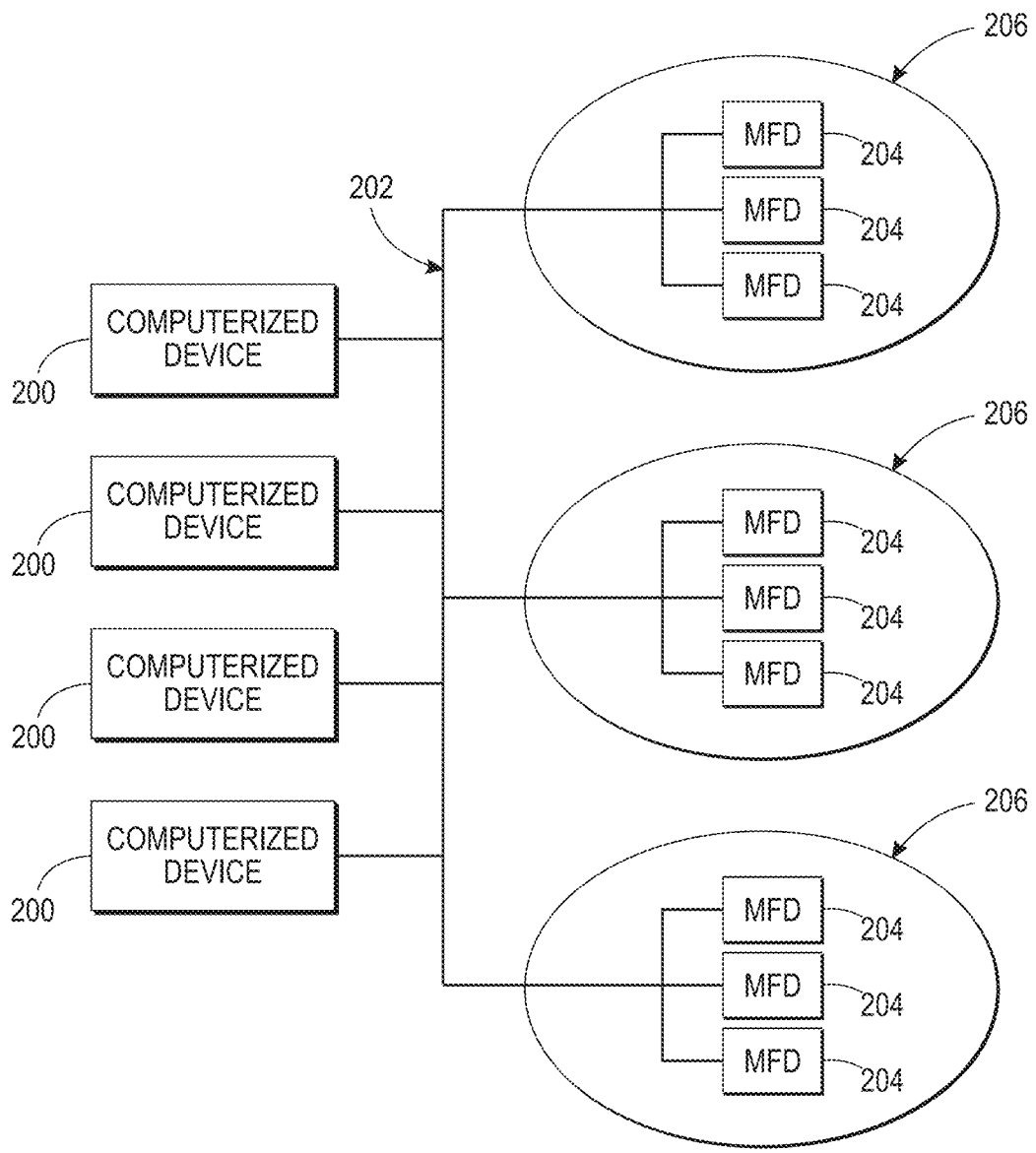
FIG. 5 is a schematic diagram of a device according to embodiments herein.

As shown in FIG. 5, exemplary system embodiments herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 6:
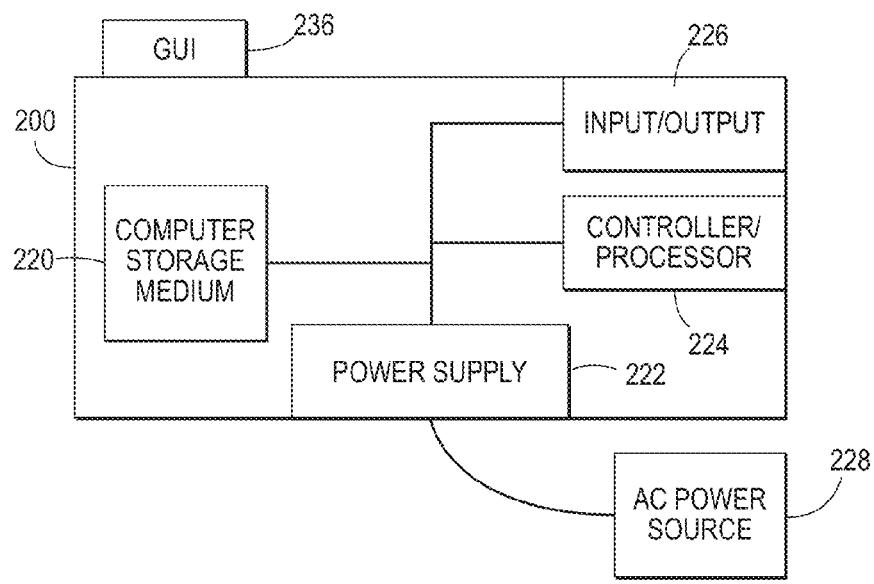
FIG. 6 is a schematic diagram of a device according to embodiments herein.

FIG. 6 illustrates a computerized device 200, which can be used with embodiments herein and can comprise, for example, a print server, a personal computer, a portable computing device, etc. The computerized device 200 includes a controller/processor 224 and a communications port (input/output) 226 operatively connected to the processor 224 and to a computerized network external to the computerized device 200. Also, the computerized device 200 can include at least one accessory functional component, such as a graphic user interface assembly 236 that also operates on the power supplied from the external power source 228 (through the power supply 222).

The input/output device 226 is used for communications to and from the computerized device 200. The processor 224 controls the various actions of the computerized device. A non-transitory (non-volatile) computer storage medium device 220 (which can be optical, magnetic, capacitor based, etc.) is readable by the processor 224 and stores instructions that the processor 224 executes to allow the computerized device to perform its various functions, such as those described herein. The storage device 220 can store the file containing the common color metameric pairs for the many printers that may access such a file over the network 202. Thus, as shown in FIG. 9, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 7:
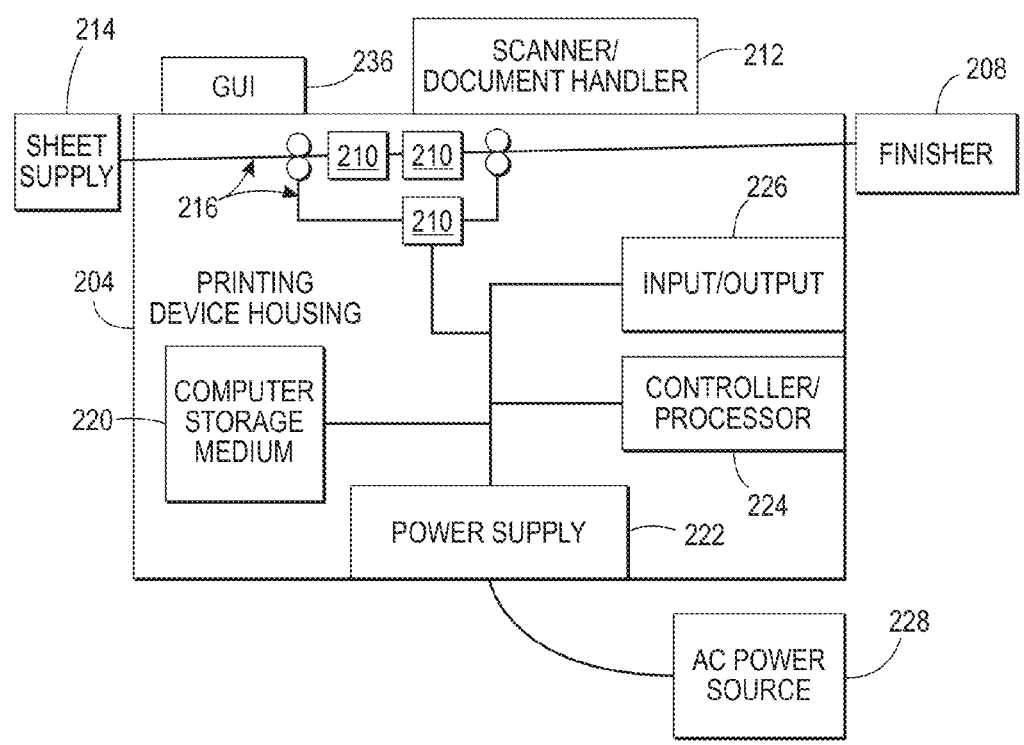
FIG. 7 is a schematic diagram of a device according to embodiments herein.

FIG. 7 illustrates a computerized device that is a printing device 204, which can be used with embodiments herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

In either type of device, the DFE or processor 224 controls the marking engine 210 to print a uniform region having the visually uniform color for an observer within all areas of the uniform region. The processor 224 also controls the marking engine 210 to print different gloss patterns within the uniform region. The processor 224 accesses, through the input/output device 226 and network 202, the common color metameric pairs stored within the non-transitory storage medium 202 (in items 200, for example) external to the printing device 204.

Again, common color metameric pair has the same appearance color, but a different gloss level. The gloss levels and the appearance colors are based on common printing capabilities of different printers, and the printing device 204 is one of those different printers.

The processor 224 identifies specific metameric pairs from the common color metameric pairs corresponding to the printing device 204. The processor 224 can then process a print job through the printing engine 210 using the specific metameric pairs to produce printed items having a differential gloss security feature. Again, the differential gloss security feature comprises patterns of different gloss levels in an area of uniform appearance color. The processor 224 can extrapolate between the specific metameric pairs to produce additional colors of the print job during the processing of the print job.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A method comprising:
   identifying gloss levels and appearance colors for different printers based on common printing capabilities of said different printers, said gloss levels and said appearance colors being formed from different combinations of one or more colorant marking materials combined on a print substrate surface; and
   identifying common color metameric pairs based on said gloss levels and said appearance colors,
   each of said common color metameric pairs having a same appearance color and a different gloss level and producing a differential gloss security feature when printed, and
   said differential gloss security feature comprising patterns of different gloss levels in an area of uniform appearance color.

2. The method according to claim 1, further comprising evaluating said gloss levels and said appearance colors for different combinations of said colorant marking materials combined on said print substrate surface to produce a gloss level value and an appearance color value for each of said combinations of said colorant marking materials.

3. The method according to claim 2, said identifying common color metameric pairs comprising selecting a metameric pair, for each of said appearance colors, that has a relatively largest difference of said gloss level value and a relatively smallest difference of said appearance color value.

4. The method according to claim 1, said gloss levels being different based on different heights of stacks of said colorant marking materials on said print substrate surface.

5. The method according to claim 1, differences in said gloss levels being only observable at a non-perpendicular angle to said print substrate surface that reflects said different gloss levels differently.

6. The method according to claim 1, further comprising, when processing a print job, extrapolating between said metameric pairs to produce additional colors of said print job.

7. A method comprising:
   identifying gloss levels and appearance colors for different printers based on common printing capabilities of said different printers, said gloss levels and said appearance colors being formed from different combinations of one or more colorant marking materials combined on a print substrate surface;
   identifying common color metameric pairs based on said gloss levels and said appearance colors, each of said common color metameric pairs having a same appearance color and a different gloss level;
   identifying specific metameric pairs from said common color metameric pairs for a specific printer of said different printers; and
   processing a print job through said specific printer using said specific metameric pairs to produce printed items having a differential gloss security feature,
   said differential gloss security feature comprising patterns of different gloss levels in an area of uniform appearance color.

8. The method according to claim 7, further comprising evaluating said gloss levels and said appearance colors for different combinations of said colorant marking materials combined on said print substrate surface to produce a gloss level value and an appearance color value for each of said combinations of said colorant marking materials.

9. The method according to claim 8, said identifying common color metameric pairs comprising selecting a metameric pair, for each of said appearance colors, that has a relatively largest difference of said gloss level value and a relatively smallest difference of said appearance color value.

10. The method according to claim 7, said gloss levels being different based on different heights of stacks of said colorant marking materials on said print substrate surface.

11. The method according to claim 7, differences in said gloss levels being only observable at a non-perpendicular angle to said print substrate surface that reflects said different gloss levels differently.

12. The method according to claim 7, said processing of said print job comprising extrapolating between said specific metameric pairs to produce additional colors of said print job.

13. A method comprising:
identifying gloss levels and appearance colors for different printers based on common printing capabilities of said different printers, said gloss levels and said appearance colors being formed from different combinations of one or more colorant marking materials stacked on a print substrate surface;
identifying common color metameric pairs based on said gloss levels and said appearance colors, each of said common color metameric pairs having a same appearance color and a different gloss level;
storing said common color metameric pairs in a non-transitory storage medium operatively connected to at least one of said different printers;
accessing said common color metameric pairs within said non-transitory storage medium using a specific printer of said different printers;
identifying specific metameric pairs from said common color metameric pairs for said specific printer; and
processing a print job through said specific printer using said specific metameric pairs to produce printed items having a differential gloss security feature,
said differential gloss security feature comprising patterns of different gloss levels in an area of uniform appearance color.

14. The method according to claim 13, further comprising evaluating said gloss levels and said appearance colors for different combinations of said colorant marking materials stacked on said print substrate surface to produce a gloss level value and an appearance color value for each of said combinations of said colorant marking materials.

15. The method according to claim 14, said identifying common color metameric pairs comprising selecting a metameric pair, for each of said appearance colors, that has a relatively largest difference of said gloss level value and a relatively smallest difference of said appearance color value.

16. The method according to claim 13, said gloss levels being different based on different heights of stacks of said colorant marking materials on said print substrate surface.

17. The method according to claim 13, differences in said gloss levels being only observable at a non-perpendicular angle to said print substrate surface that reflects said different gloss levels differently.

18. The method according to claim 13, said processing of said print job comprising extrapolating between said specific metameric pairs to produce additional colors of said print job.

19. A printing device comprising:
a processor device;
an input/output device operatively connected to said processor; and
a printing engine operatively connected to said processor,
said processor device accessing, through said input/output device, common color metameric pairs stored within a non-transitory storage medium external to said printing device,
each of said common color metameric pairs having a same appearance color and a different gloss level,
gloss levels and appearance colors of said common color metameric pairs being formed from different combinations of one or more colorant marking materials stacked on a print substrate surface,
said gloss levels and said appearance colors being based on common printing capabilities of different printers,
said printing device comprising one of said different printers,
said processor device identifying specific metameric pairs from said common color metameric pairs corresponding to said printing device,
said processor device processing a print job through said printing engine using said specific metameric pairs to produce printed items having a differential gloss security feature, and
said differential gloss security feature comprising patterns of different gloss levels in an area of uniform appearance color.

20. The printing device according to claim 19, said common color metameric pairs being identified by evaluating said gloss levels and said appearance colors for different combinations of said colorant marking materials stacked on said print substrate surface to produce a gloss level value and an appearance color value for each of said combinations of said colorant marking materials.

21. The printing device according to claim 20, said common color metameric pairs being identified by selecting a metameric pair, for each of said appearance colors, that has a relatively largest difference of said gloss level value and a relatively smallest difference of said appearance color value.

22. The printing device according to claim 19, said gloss levels being different based on different heights of stacks of said colorant marking materials on said print substrate surface.

23. The printing device according to claim 19, differences in said gloss levels being only observable at a non-perpendicular angle to said print substrate surface that reflects said different gloss levels differently.

24. The printing device according to claim 19, said processor device extrapolating between said specific metameric pairs to produce additional colors of said print job during said processing of said print job.

* * * * *